United States Patent
Li et al.

(10) Patent No.: US 11,580,311 B2
(45) Date of Patent: Feb. 14, 2023

(54) INPUT METHOD LANGUAGE DETERMINATION

(71) Applicant: Citrix Systems, Inc., Fort Lauderdale, FL (US)

(72) Inventors: Qiming Li, Nanjing (CN); SungTae Han, Nanjing (CN); Sheng-Chi Zhang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 207 days.

(21) Appl. No.: 16/919,572

(22) Filed: Jul. 2, 2020

(65) Prior Publication Data

US 2021/0357598 A1    Nov. 18, 2021

Related U.S. Application Data

(63) Continuation of application No. PCT/CN2020/090714, filed on May 16, 2020.

(51) Int. Cl.
  *G06F 40/58*    (2020.01)
  *G06F 40/51*    (2020.01)
  *H04L 51/046*   (2022.01)

(52) U.S. Cl.
  CPC .......... *G06F 40/58* (2020.01); *G06F 40/51* (2020.01); *H04L 51/046* (2013.01)

(58) Field of Classification Search
  CPC .. H04L 51/046; H04L 12/1827; H04L 51/066
  See application file for complete search history.

(56) References Cited

U.S. PATENT DOCUMENTS 8,874,429 B1 * 10/2014 Crosley .................... H04N 5/05
                                                  348/14.08
2004/0243392 A1 * 12/2004 Chino ..................... G06F 40/58
                                                  704/7

(Continued)

FOREIGN PATENT DOCUMENTS

CN    105282318 A    1/2016
CN    106775350 A    5/2017

(Continued)

OTHER PUBLICATIONS

W. Richard Stevens. "TCP/IP Illustrated, vol. 1 The Protocols". Addison-Wesley, Reading, Massachusetts, 1995 (Year: 1995).*

(Continued)

*Primary Examiner* — Jesse S Pullias

(57) ABSTRACT

Techniques are disclosed for determining a target language for a communication session and configuring a language mode of an input method editor (IME) to the target language. An example methodology implementing the techniques includes, by a computing device, detecting a communication to a recipient via a software application running on the computing device, determining a target language for the communication, and configuring a language mode of an input method editor to the target language. The target language may be determined based on an attribute or attributes of the recipient of the communication. In some cases, the target language may be determined based on an attribute or attributes of a contents of a prior communication.

15 Claims, 10 Drawing Sheets

(56) References Cited

U.S. PATENT DOCUMENTS

| | | | |
|---|---|---|---|
| 2008/0077393 A1* | 3/2008 | Gao | G06F 3/0236 |
| | | | 704/8 |
| 2012/0029902 A1* | 2/2012 | Lu | G06F 3/018 |
| | | | 704/2 |
| 2014/0019115 A1* | 1/2014 | Hong | G06F 40/263 |
| | | | 704/4 |
| 2014/0035823 A1 | 2/2014 | Khoe et al. | |
| 2016/0162473 A1* | 6/2016 | Cogley | G06F 40/51 |
| | | | 704/9 |
| 2016/0344678 A1* | 11/2016 | MacDonald | H04L 51/18 |
| 2019/0377425 A1 | 12/2019 | Ryu et al. | |

FOREIGN PATENT DOCUMENTS

| | | |
|---|---|---|
| CN | 109189298 A | 1/2019 |
| CN | 109669552 A | 4/2019 |

OTHER PUBLICATIONS

PCT International Search Report and Written Opinion dated Feb. 19, 2021 for International Application No. PCT/CN2020/090714; 9 pages.

\* cited by examiner

INPUT METHOD LANGUAGE DETERMINATION

CROSS REFERENCE TO RELATED APPLICATION

This application is a continuation of and claims the benefit of PCT Patent Application No. PCT/CN2020/090714 filed on May 16, 2020 in the English language in the State Intellectual Property Office and designating the United States, the contents of which are hereby incorporated herein by reference in its entirety.

BACKGROUND

Due, at least in part, to the increasing reliance on cloud-based services and platforms, organizations, such as companies, enterprises, governments, and agencies, are implementing digital workspace solutions. These digital workplace solutions provide an integrated technology framework designed to deliver and manage applications, data, and desktop delivery. For example, through the digital workspace, employees are able to access their applications and data in real-time from any location.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one example embodiment provided to illustrate the broader concepts, systems, and techniques described herein, a method may include, by a computing device, detecting a communication to a recipient via a software application running on the computing device, determining a target language for the communication, and configuring a language mode of an input method editor to the target language.

According to another illustrative embodiment provided to illustrate the broader concepts described herein, a system includes a memory and one or more processors in communication with the memory. The processor may be configured to detect a communication to a recipient via a software application running on the computing device, determine a target language for the communication, and configure a language mode of an input method editor to the target language.

According to another illustrative embodiment provided to illustrate the broader concepts described herein, a method may include, by a computing device, extracting at least one data item from a remote server and processing the at least one data item to determine a target language for the data item.

According to another illustrative embodiment provided to illustrate the broader concepts described herein, a system includes a memory and one or more processors in communication with the memory. The processor may be configured to extract at least one data item from a remote server and process the at least one data item to determine a target language for the data item.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
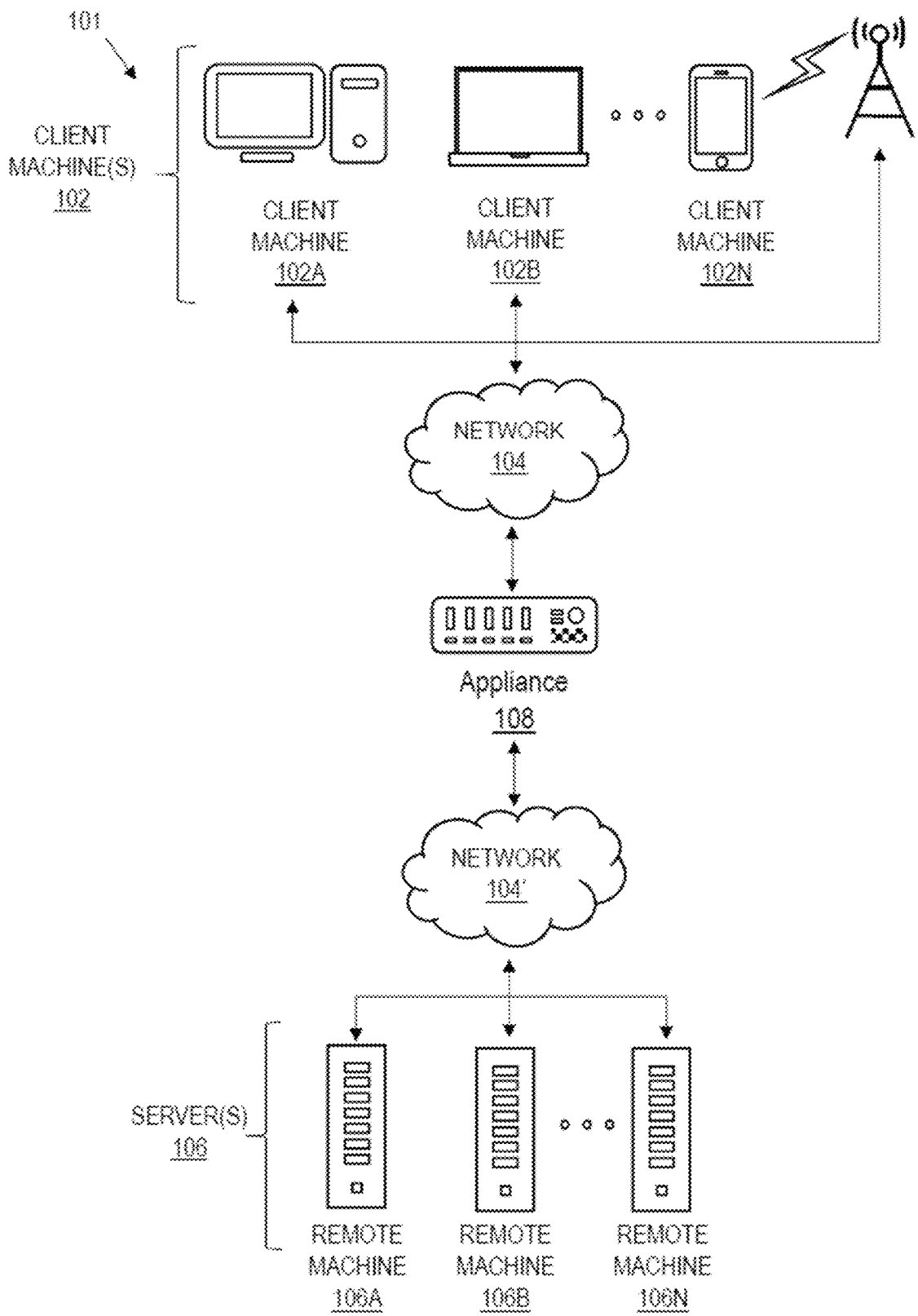
FIG. 1 is a diagram of an illustrative network computing environment in which embodiments of the present disclosure may be implemented.

A digital workspace provides an infrastructure that empowers employees located throughout the world to collaborate and communicate with one another. Employees increasingly find themselves communicating with colleagues and other individuals in multiple languages in the course of performing their tasks. For example, an employee located in China may use an email application running on a computing device to send an email to a colleague located in New York in English. Soon after, the employee may find it necessary to send a communication using a conferencing application running on the computing device to communicate with another colleague located in Korea in Korean. During the same conferencing session, the employee may communicate with a different colleague located in Japan in Japanese. The employee may then have to use the email application to send an email to a colleague located in China in Chinese. In order to send these various communications, the employee will have to change the input language on the computing device, for example, from Chinese to English, then to Korean, then to Japanese, and then back to Chinese.

As such, it can be an inconvenience and even annoyance for a user to have to change the input language multiple times in performing his or her tasks.

Concepts, devices, systems, and techniques are disclosed for determining a target language for a communication session and configuring a language mode of an input method editor (IME) to the target language. The target language may be determined based on characteristics of a communication to be made or otherwise generated using the IME. In some embodiments, the target language may be determined based on an attribute or attributes of the recipient of the communication. Additionally or alternatively, in cases where a communication is part of a communication thread (e.g., a reply to a prior communication), the target language may be determined based on an attribute or attributes of the prior communication in the communication thread. In any case, upon determination of a need to instantiate an IME for a communication session, a target language for the communication may be determined, and the language mode of the IME may be set to the determined target language.

In more detail, and in accordance with an embodiment of the present disclosure, target language determination is achieved using a computing server (sometimes referred to herein more simply as a "server") that provides functionality for other programs or devices. In an embodiment, a target language server may retrieve or otherwise obtain data items (e.g., user account information and communication items). The data items may include data items that are not readily available (e.g., information that is protected or privileged). To obtain such data items, the target language server may provide authentication credentials which may be used to authenticate and authorize the target language server to retrieve or otherwise obtain such data items.

In some embodiments, the target language server may retrieve or otherwise obtain user account information from private or public servers, such as an Active Directory server and other directory or domain servers. Such user account information may be information that is associated with user accounts of users of an organization. The user account information may be also related to user accounts made or established with telecommunications applications and services that support real-time text communications, such as GoToMeeting™, Zoom, WeChat®, SLACK®, Skype®, Microsoft® Teams, and other communication and collaboration applications and services. In some embodiments, the target language server may also retrieve or otherwise obtain readily available user account information related to user accounts made or established with applications and services that support store-and-forward text communications, such as email services.

Upon retrieving the user account information, the target language server can determine target languages for the user accounts based on an attribute or attributes of the user accounts, such as account name (e.g., account holder's name), nationalities of users associated with or otherwise identified by the user accounts, and geographic region associated with or otherwise assigned to the user accounts. For example, if a user account is associated with a user located in China, it can be determined that the target language for the user account is Chinese. The target language server can then label or otherwise assign to the user accounts target language values that represent the determined target languages. A target language value may represent a language, such as English, Chinese, Korean, Japanese, Spanish, German, and Italian, to name a few examples. The target language values assigned to the user accounts can then be used to identify a target language to use when authoring or otherwise composing a communication to a particular user account.

In some embodiments, the target language server may retrieve or otherwise obtain communication items, such as emails and messages, from private or public servers, such as mail servers and other store-and-forward messaging servers. Such communication items may include both incoming and outgoing communications (e.g., incoming and outgoing email messages) to an organization's messaging domain. The target language server can then determine target languages for the communication items based on an attribute or attributes of the contents of the retrieved items of communication. For example, if the contents of a communication, such as an email message, is predominantly (e.g., >50%) in English, it can be determined that the target language of the communication is English. The target language server can then label or otherwise assign to the communication items target language values that represent the determined target languages. The target language values assigned to the communication items can then be used to identify a target language to use when authoring or otherwise composing a communication that is part of a communication thread that includes the communication item (e.g., a reply or a reply all to an email message).

In some implementations, the target language server does not retain copies of the retrieved communication items, such as copies of the email messages. Rather, the target language server may retain a portion or portions of a communication item needed to uniquely identify the item of communication. The target language server can then label or otherwise assign to the retained portion of the item of communication a target language value which represents the language of the contents of the communication item. For example, in the case of an email message, the server may retain a portion of the email message that is sufficient to identify the email message, such as the email message header (e.g., sender information, recipient information, subject, and date and time of an email message or messages being sent and/or replied to), and label or otherwise assign to the email message header a target language value.

Then, when a user activates or otherwise launches a messaging feature of an application software (or more simply an "application") running on a computing device, the computing device can query the target language server for a target language value. Upon receiving a target language value, the computing device can configure a language mode of an IME to a target language represented by the target language value and provide the IME to the user for use in authoring or otherwise composing a communication to the other user.

For example, if the user is attempting to send a chat message to another user (i.e., a recipient user) during a web conferencing session, the computing device can identify a recipient user account for the chat message. The computing device can then query the target language server for a target language value assigned to the recipient user account. As another example, if the user is attempting to send an email message in an email thread (e.g., reply to a prior email message), the computing device can query the target language server for a target language value assigned to the prior email message. In any case, upon receiving the target language value from the target language server in response to the query, the computing device can configure a language mode of an IME to the langue represented by the target language value. The user can then use the configured IME to author or otherwise compose a communication to the other user without having to configure the IME language mode setting. These and other advantages, variations, and embodiments will be apparent in light of this disclosure.

Referring now to FIG. 1, shown is an illustrative network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
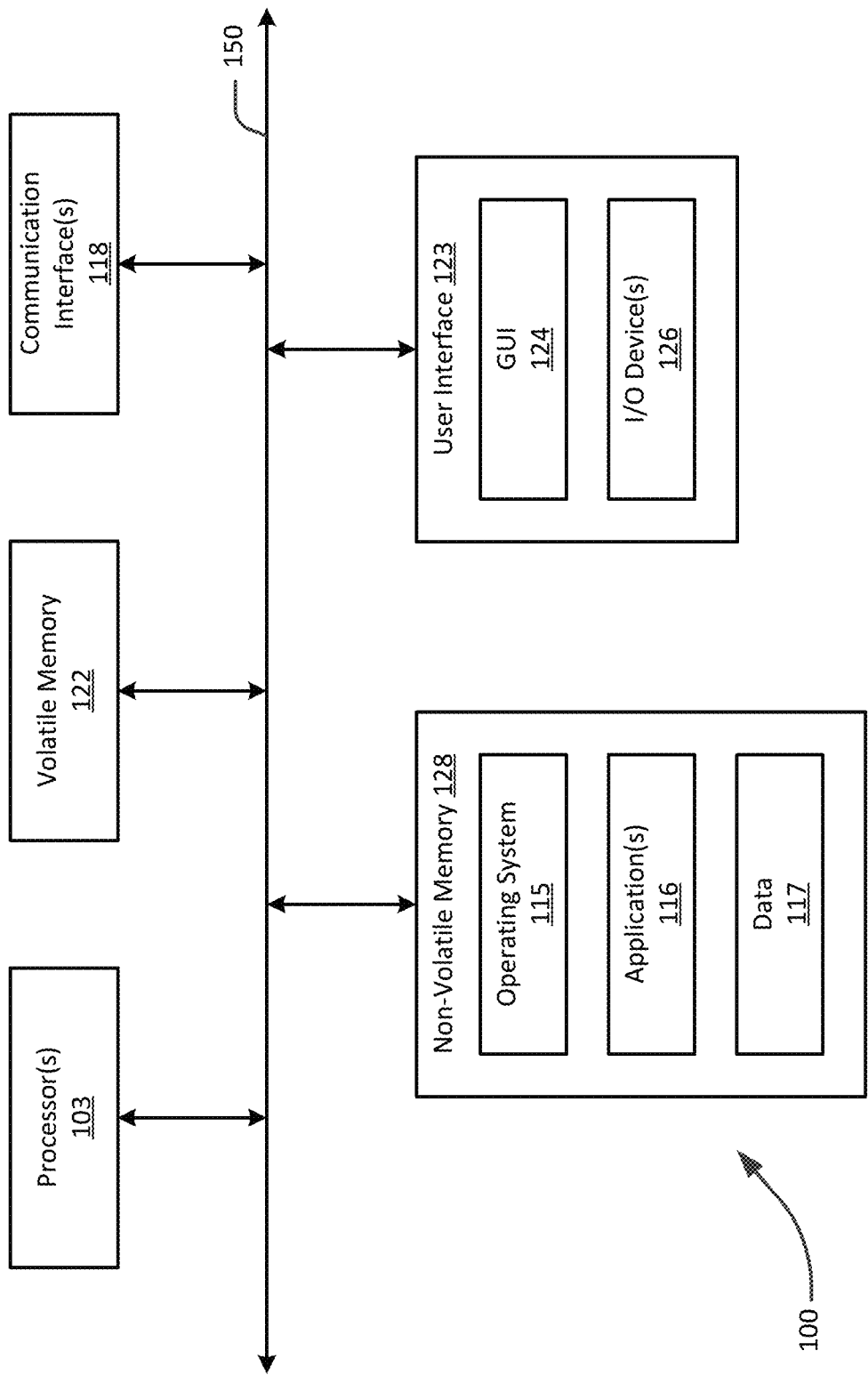
FIG. 2 is a block diagram illustrating selective components of an example computing device in which various aspects of the disclosure may be implemented, in accordance with an embodiment of the present disclosure.

FIG. 2 is a block diagram illustrating selective components of an illustrative computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an illustrative client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
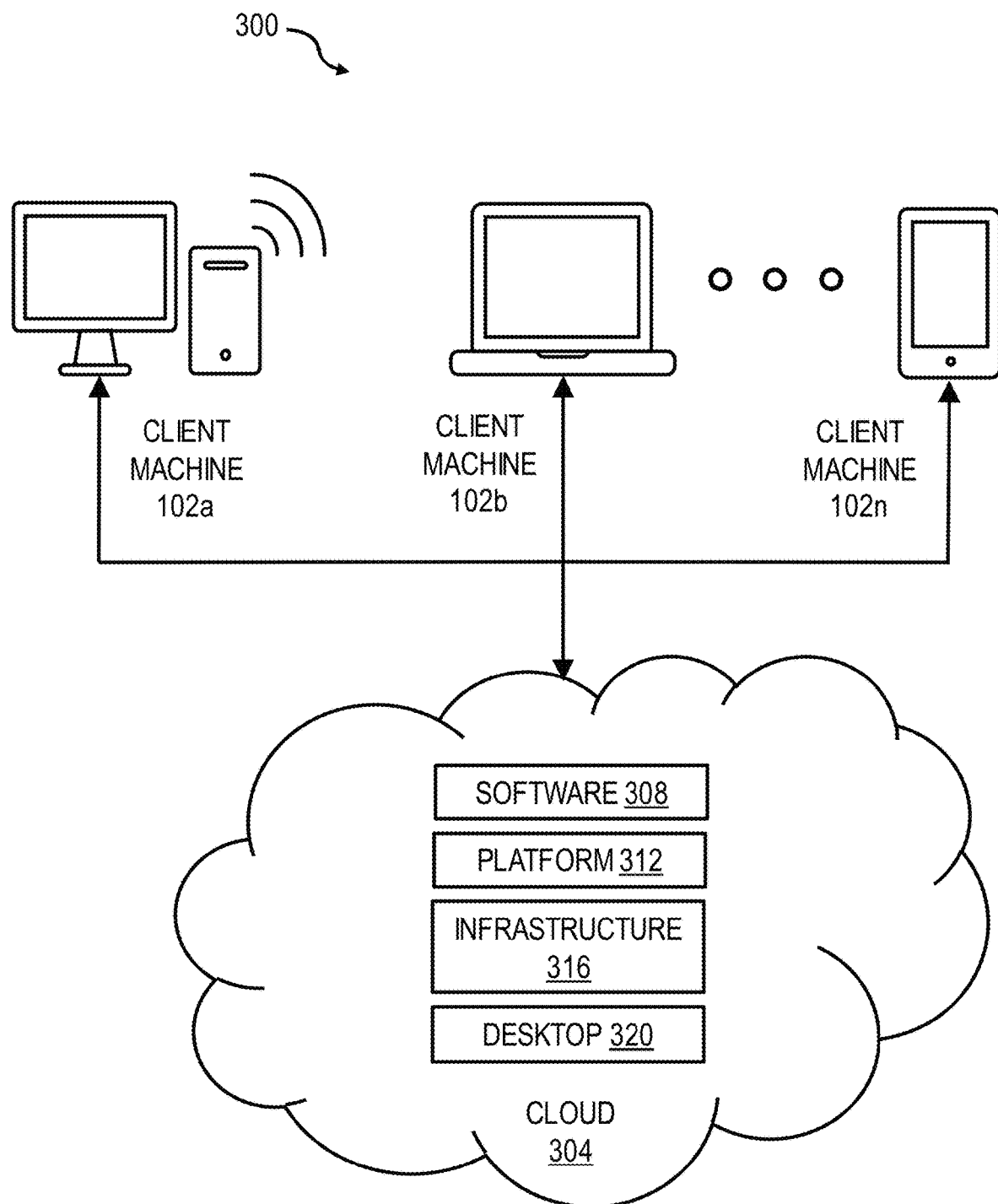
FIG. 3 is a schematic block diagram of a cloud computing environment in which various aspects of the disclosure may be implemented.

Referring to FIG. 3, a cloud computing environment 300 is depicted, which may also be referred to as a cloud environment, cloud computing or cloud network. Cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more clients 102a-102n (such as those described above) are in communication with a cloud network 304. Cloud network 304 may include back-end platforms, e.g., servers, storage, server farms or data centers. The users or clients 102a-102n can correspond to a single organization/tenant or multiple organizations/tenants. More particularly, in one illustrative implementation, cloud computing environment 300 may provide a private cloud serving a single organization (e.g., enterprise cloud). In another example, cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, cloud computing environment 300 may provide a hybrid cloud that is a combination of a public cloud and a private cloud. Public clouds may include public servers that are maintained by third parties to clients 102a-102n or the enterprise/tenant. The servers may be located off-site in remote geographical locations or otherwise.

Cloud computing environment 300 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, cloud computing environment 300 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. Cloud computing environment 300 can provide an elasticity to dynamically scale out or scale in response to different demands from one or more clients 102. In some embodiments, cloud computing environment 300 can include or provide monitoring services to monitor, control and/or generate reports corresponding to the provided shared services and resources.

In some embodiments, cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS) 320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
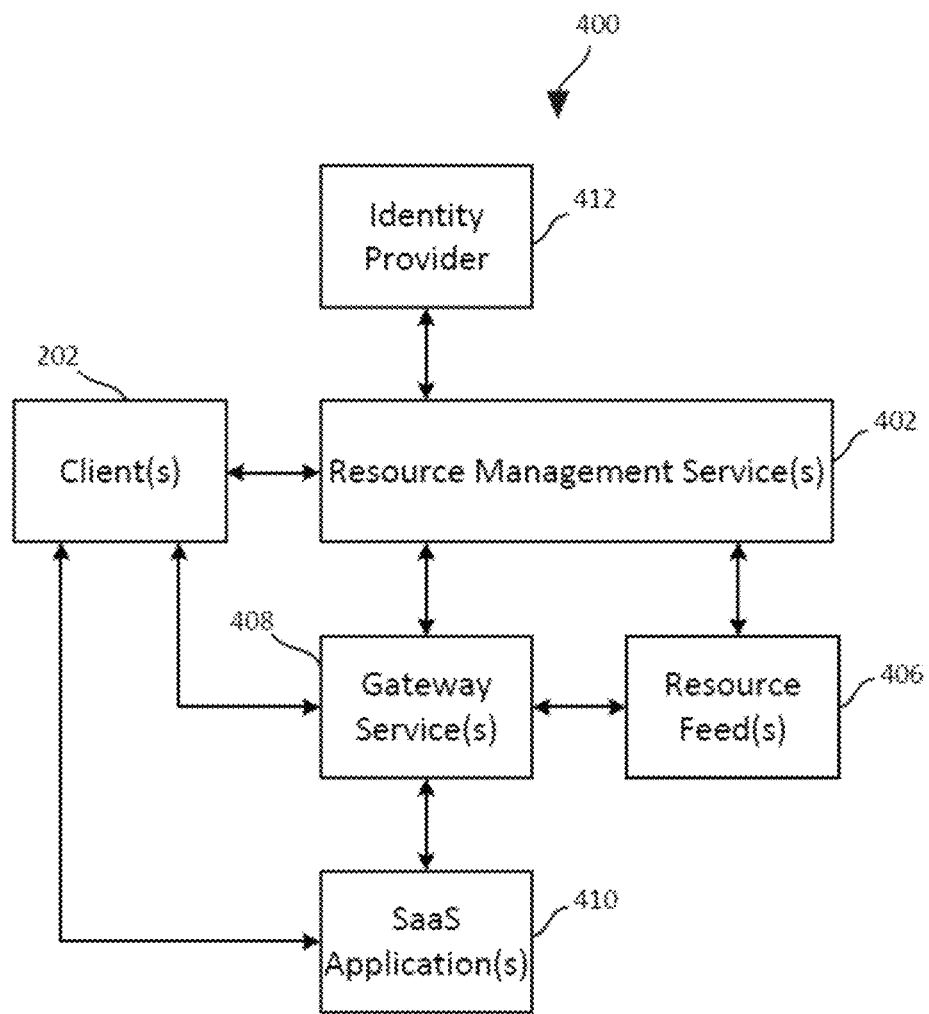
FIG. 4A is a block diagram of an illustrative system in which resource management services may manage and streamline access by clients to resource feeds (via one or more gateway services) and/or software-as-a-service (SaaS) applications.

FIG. 4A is a block diagram of an illustrative system 400 in which one or more resource management services 402 may manage and streamline access by one or more clients 202 to one or more resource feeds 406 (via one or more gateway services 408) and/or one or more software-as-a-service (SaaS) applications 410. In particular, resource management service(s) 402 may employ an identity provider 412 to authenticate the identity of a user of a client 202 and, following authentication, identify one of more resources the user is authorized to access. In response to the user selecting one of the identified resources, resource management service(s) 402 may send appropriate access credentials to the requesting client 202, and the requesting client 202 may then use those credentials to access the selected resource. For resource feed(s) 406, client 202 may use the supplied credentials to access the selected resource via gateway service 408. For SaaS application(s) 410, client 202 may use the credentials to access the selected application directly.

Client(s) 202 may be any type of computing devices capable of accessing resource feed(s) 406 and/or SaaS application(s) 410, and may, for example, include a variety of desktop or laptop computers, smartphones, tablets, etc. Resource feed(s) 406 may include any of numerous resource types and may be provided from any of numerous locations. In some embodiments, for example, resource feed(s) 406 may include one or more systems or services for providing virtual applications and/or desktops to client(s) 202, one or more file repositories and/or file sharing systems, one or more secure browser services, one or more access control services for SaaS applications 410, one or more management services for local applications on client(s) 202, one or more internet enabled devices or sensors, etc. Each of resource management service(s) 402, resource feed(s) 406, gateway service(s) 408, SaaS application(s) 410, and identity provider 412 may be located within an on-premises data center of an organization for which system 400 is deployed, within one or more cloud computing environments, or elsewhere.

Figure 4B:
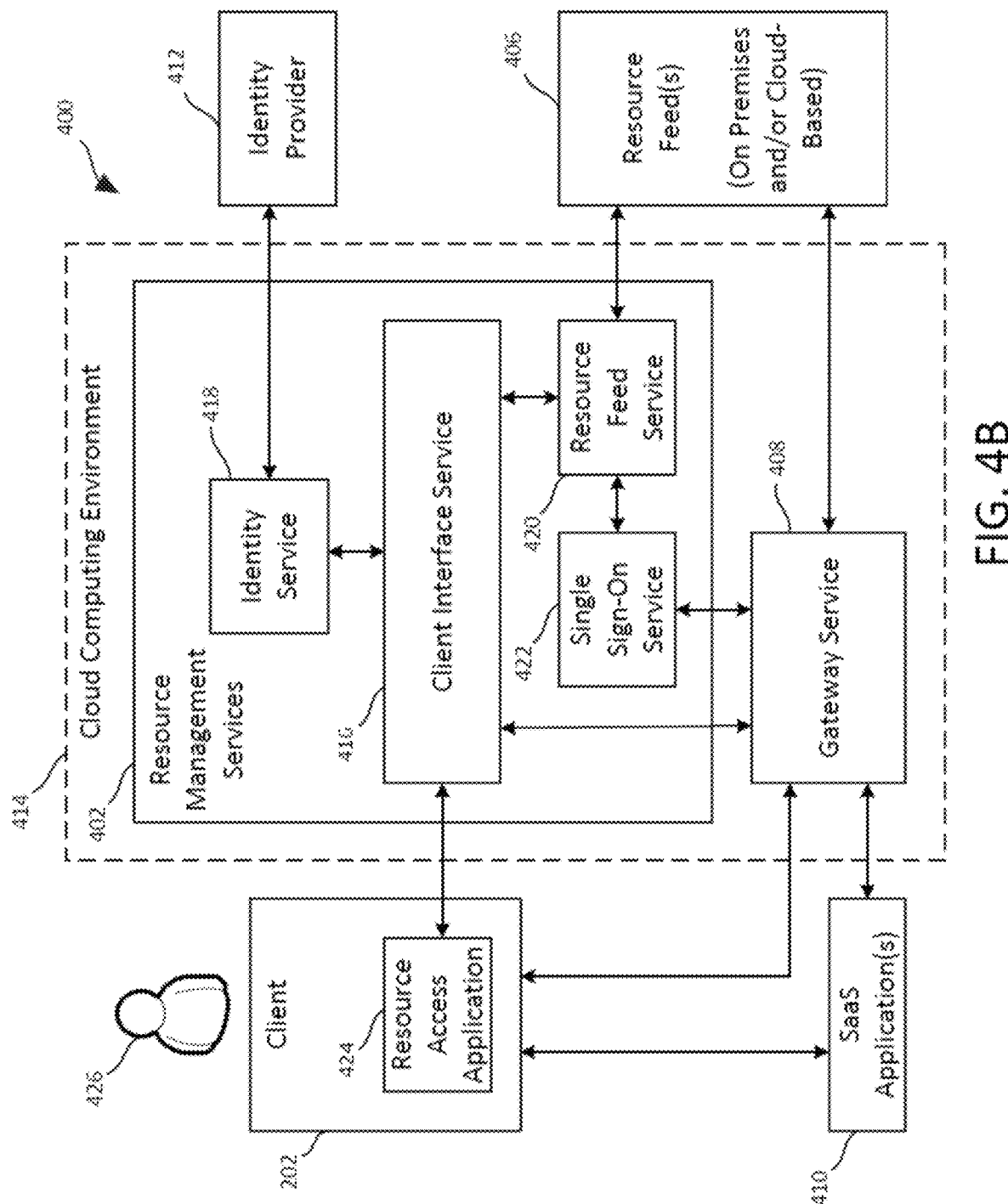
FIG. 4B is a block diagram showing an illustrative implementation of the system shown in FIG. 4A in which various resource management services as well as a gateway service are located within a cloud computing environment.

FIG. 4B is a block diagram showing an illustrative implementation of system 400 shown in FIG. 4A in which various resource management services 402 as well as gateway service 408 are located within a cloud computing environment 414. The cloud computing environment may, for example, include Microsoft Azure Cloud, Amazon Web Services, Google Cloud, or IBM Cloud.

For any of illustrated components (other than client 202) that are not based within cloud computing environment 414, cloud connectors (not shown in FIG. 4B) may be used to interface those components with cloud computing environment 414. Such cloud connectors may, for example, run on Windows Server instances hosted in resource locations and may create a reverse proxy to route traffic between the site(s) and cloud computing environment 414. In the illustrated example, the cloud-based resource management services 402 include a client interface service 416, an identity service 418, a resource feed service 420, and a single sign-on service 422. As shown, in some embodiments, client 202 may use a resource access application 424 to communicate with client interface service 416 as well as to present a user interface on client 202 that a user 426 can operate to access resource feed(s) 406 and/or SaaS application(s) 410. Resource access application 424 may either be installed on client 202 or may be executed by client interface service 416 (or elsewhere in system 400) and accessed using a web browser (not shown in FIG. 4B) on client 202.

As explained in more detail below, in some embodiments, resource access application 424 and associated components may provide user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When resource access application 424 is launched or otherwise accessed by user 426, client interface service 416 may send a sign-on request to identity service 418. In some embodiments, identity provider 412 may be located on the premises of the organization for which system 400 is deployed. Identity provider 412 may, for example, correspond to an on-premises Windows Active Directory. In such embodiments, identity provider 412 may be connected to the cloud-based identity service 418 using a cloud connector (not shown in FIG. 4B), as described above. Upon receiving a sign-on request, identity service 418 may cause resource access application 424 (via client interface service 416) to prompt user 426 for the user's authentication credentials (e.g., username and password). Upon receiving the user's authentication credentials, client interface service 416 may pass the credentials along to identity service 418, and identity service 418 may, in turn, forward them to identity provider 412 for authentication, for example, by comparing them against an Active Directory domain. Once identity service 418 receives confirmation from identity provider 412 that the user's identity has been properly authenticated, client interface service 416 may send a request to resource feed service 420 for a list of subscribed resources for user 426.

In other embodiments (not illustrated in FIG. 4B), identity provider 412 may be a cloud-based identity service, such as a Microsoft Azure Active Directory. In such embodiments, upon receiving a sign-on request from client interface service 416, identity service 418 may, via client interface service 416, cause client 202 to be redirected to the cloud-based identity service to complete an authentication process. The cloud-based identity service may then cause client 202 to prompt user 426 to enter the user's authentication credentials. Upon determining the user's identity has been properly authenticated, the cloud-based identity service may send a message to resource access application 424 indicating the authentication attempt was successful, and resource access application 424 may then inform client interface service 416 of the successfully authentication. Once identity service 418 receives confirmation from client interface service 416 that the user's identity has been properly authenticated, client interface service 416 may send a request to resource feed service 420 for a list of subscribed resources for user 426.

For each configured resource feed, resource feed service 420 may request an identity token from single sign-on service 422. Resource feed service 420 may then pass the feed-specific identity tokens it receives to the points of authentication for the respective resource feeds 406. Each resource feed 406 may then respond with a list of resources configured for the respective identity. Resource feed service 420 may then aggregate all items from the different feeds and forward them to client interface service 416, which may cause resource access application 424 to present a list of available resources on a user interface of client 202. The list of available resources may, for example, be presented on the user interface of client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on client 202, and/or one or more SaaS applications 410 to which user 426 has subscribed. The lists of local applications and SaaS applications 410 may, for example, be supplied by resource feeds 406 for respective services that manage which such applications are to be made available to user 426 via resource access application 424. Examples of SaaS applications 410 that may be managed and accessed as described herein include Microsoft Office 365 applications, SAP SaaS applications, Workday applications, etc.

For resources other than local applications and SaaS application(s) 410, upon user 426 selecting one of the listed available resources, resource access application 424 may cause client interface service 416 to forward a request for the specified resource to resource feed service 420. In response to receiving such a request, resource feed service 420 may request an identity token for the corresponding feed from single sign-on service 422. Resource feed service 420 may then pass the identity token received from single sign-on service 422 to client interface service 416 where a launch ticket for the resource may be generated and sent to resource access application 424. Upon receiving the launch ticket, resource access application 424 may initiate a secure session to gateway service 408 and present the launch ticket. When gateway service 408 is presented with the launch ticket, it may initiate a secure session to the appropriate resource feed and present the identity token to that feed to seamlessly authenticate user 426. Once the session initializes, client 202 may proceed to access the selected resource.

When user 426 selects a local application, resource access application 424 may cause the selected local application to launch on client 202. When user 426 selects SaaS application 410, resource access application 424 may cause client interface service 416 request a one-time uniform resource locator (URL) from gateway service 408 as well a preferred browser for use in accessing SaaS application 410. After gateway service 408 returns the one-time URL and identifies the preferred browser, client interface service 416 may pass that information along to resource access application 424. Client 202 may then launch the identified browser and initiate a connection to gateway service 408. Gateway service 408 may then request an assertion from single sign-on service 422. Upon receiving the assertion, gateway service 408 may cause the identified browser on client 202 to be redirected to the logon page for identified SaaS application 410 and present the assertion. The SaaS may then contact gateway service 408 to validate the assertion and authenticate user 426. Once the user has been authenticated, communication may occur directly between the identified browser and the selected SaaS application 410, thus allowing user 426 to use client 202 to access the selected SaaS application 410.

In some embodiments, the preferred browser identified by gateway service 408 may be a specialized browser embedded in resource access application 424 (when the resource application is installed on client 202) or provided by one of the resource feeds 406 (when resource application 424 is located remotely), e.g., via a secure browser service. In such embodiments, SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have client interface service 416 send the link to a secure browser service, which may start a new virtual browser session with client 202, and thus allow the user to access the potentially harmful linked content in a safe environment.

In some embodiments, in addition to or in lieu of providing user 426 with a list of resources that are available to be accessed individually, as described above, user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify user 426 of something that requires the user's attention (e.g., approval of an expense report, new course available for registration, etc.).

Figure 4C:
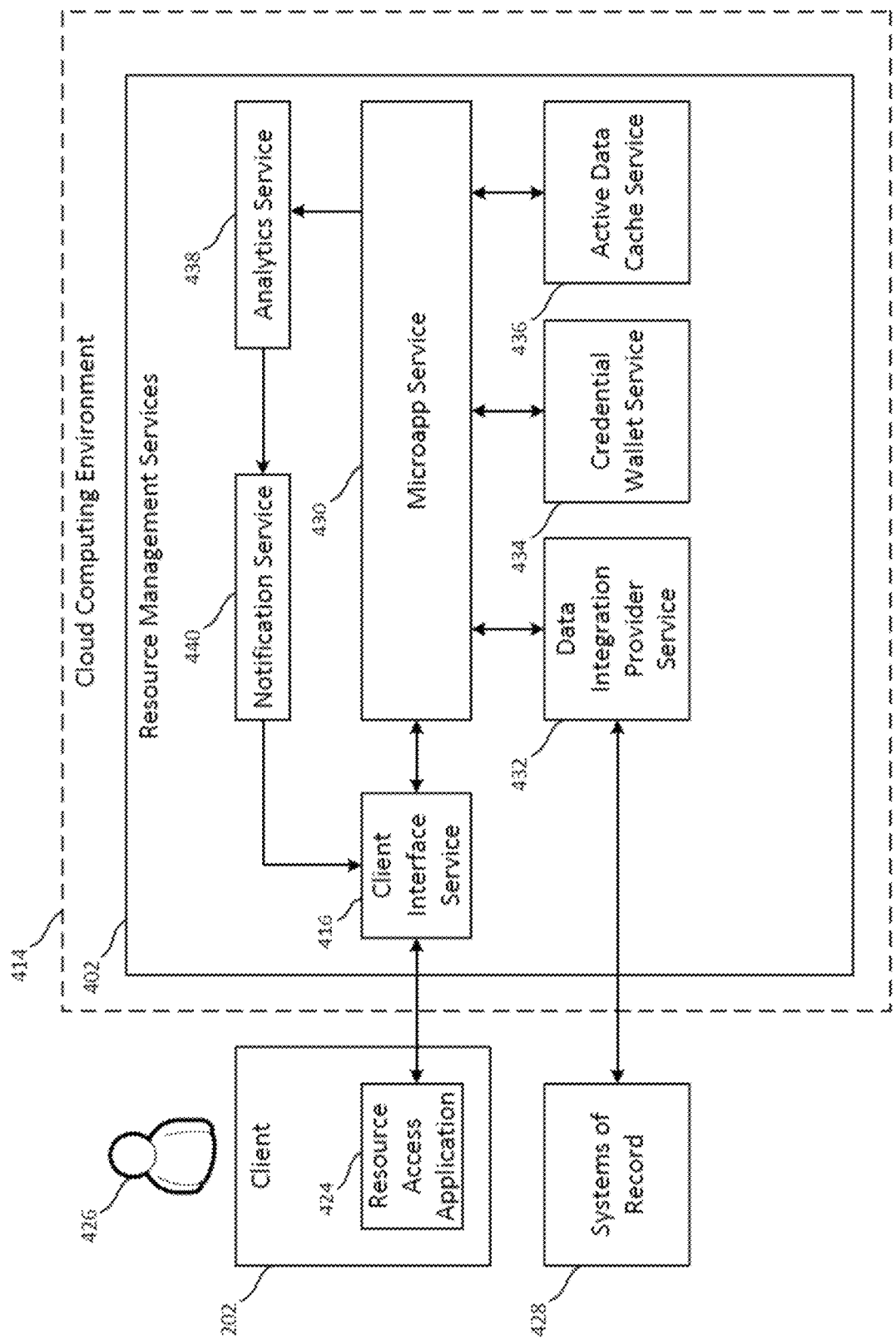
FIG. 4C is a block diagram similar to FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for client 202. In the example shown, in addition to client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within resource access application 424 without having to launch the native application. The system shown in FIG. 4C may, for example, aggregate relevant notifications, tasks, and insights, and thereby give user 426 a dynamic productivity tool. In some embodiments, the resource activity feed may be intelligently populated by utilizing machine learning and artificial intelligence (AI) algorithms. Further, in some implementations, microapps may be configured within cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, systems of record 428 may represent the applications and/or other resources resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. Resource management services 402, and in particular data integration provider service 432, may, for example, support REST API, JSON, OData-JSON, and 6ML. As explained in more detail below, data integration provider service 432 may also write back to the systems of record, for example, using OAuth2 or a service account.

In some embodiments, microapp service 430 may be a single-tenant service responsible for creating the microapps. Microapp service 430 may send raw events, pulled from systems of record 428, to analytics service 438 for processing. The microapp service may, for example, periodically pull active data from systems of record 428.

In some embodiments, active data cache service 436 may be single-tenant and may store all configuration information and microapp data. It may, for example, utilize a per-tenant database encryption key and per-tenant database credentials.

In some embodiments, credential wallet service 434 may store encrypted service credentials for systems of record 428 and user OAuth2 tokens.

In some embodiments, data integration provider service 432 may interact with systems of record 428 to decrypt end-user credentials and write back actions to systems of record 428 under the identity of the end-user. The write-back actions may, for example, utilize a user's actual account to ensure all actions performed are compliant with data policies of the application or other resource being interacted with.

In some embodiments, analytics service 438 may process the raw events received from microapps service 430 to create targeted scored notifications and send such notifications to notification service 440.

Finally, in some embodiments, notification service 440 may process any notifications it receives from analytics service 438. In some implementations, notification service 440 may store the notifications in a database to be later served in a notification feed. In other embodiments, notification service 440 may additionally or alternatively send the notifications out immediately to client 202 as a push notification to user 426.

In some embodiments, a process for synchronizing with systems of record 428 and generating notifications may operate as follows. Microapp service 430 may retrieve encrypted service account credentials for systems of record 428 from credential wallet service 434 and request a sync with data integration provider service 432. Data integration provider service 432 may then decrypt the service account credentials and use those credentials to retrieve data from systems of record 428. Data integration provider service 432 may then stream the retrieved data to microapp service 430. Microapp service 430 may store the received systems of record data in active data cache service 436 and also send raw events to analytics service 438. Analytics service 438 may create targeted scored notifications and send such notifications to notification service 440. Notification service 440 may store the notifications in a database to be later served in a notification feed and/or may send the notifications out immediately to client 202 as a push notification to user 426.

In some embodiments, a process for processing a user-initiated action via a microapp may operate as follows. Client 202 may receive data from microapp service 430 (via client interface service 416) to render information corresponding to the microapp. Microapp service 430 may receive data from active data cache service 436 to support that rendering. User 426 may invoke an action from the microapp, causing resource access application 424 to send that action to microapp service 430 (via client interface service 416). Microapp service 430 may then retrieve from credential wallet service 434 an encrypted Oauth2 token for the system of record for which the action is to be invoked and may send the action to data integration provider service 432 together with the encrypted Oath2 token. Data integration provider service 432 may then decrypt the Oath2 token and write the action to the appropriate system of record under the identity of user 426. Data integration provider service 432 may then read back changed data from the written-to system of record and send that changed data to microapp service 430. Microapp service 432 may then update active data cache service 436 with the updated data and cause a message to be sent to resource access application 424 (via client interface service 416) notifying user 426 that the action was successfully completed.

In some embodiments, in addition to or in lieu of the functionality described above, resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" Resource management services 402 may, for example, parse these requests and respond because they are integrated with multiple systems on the backend. In some embodiments, users may be able to interact with the virtual assistance through either resource access application 424 or directly from another resource, such as Microsoft Teams. This feature may allow employees to work efficiently, stay organized, and deliver only the specific information they're looking for.

Figure 5:
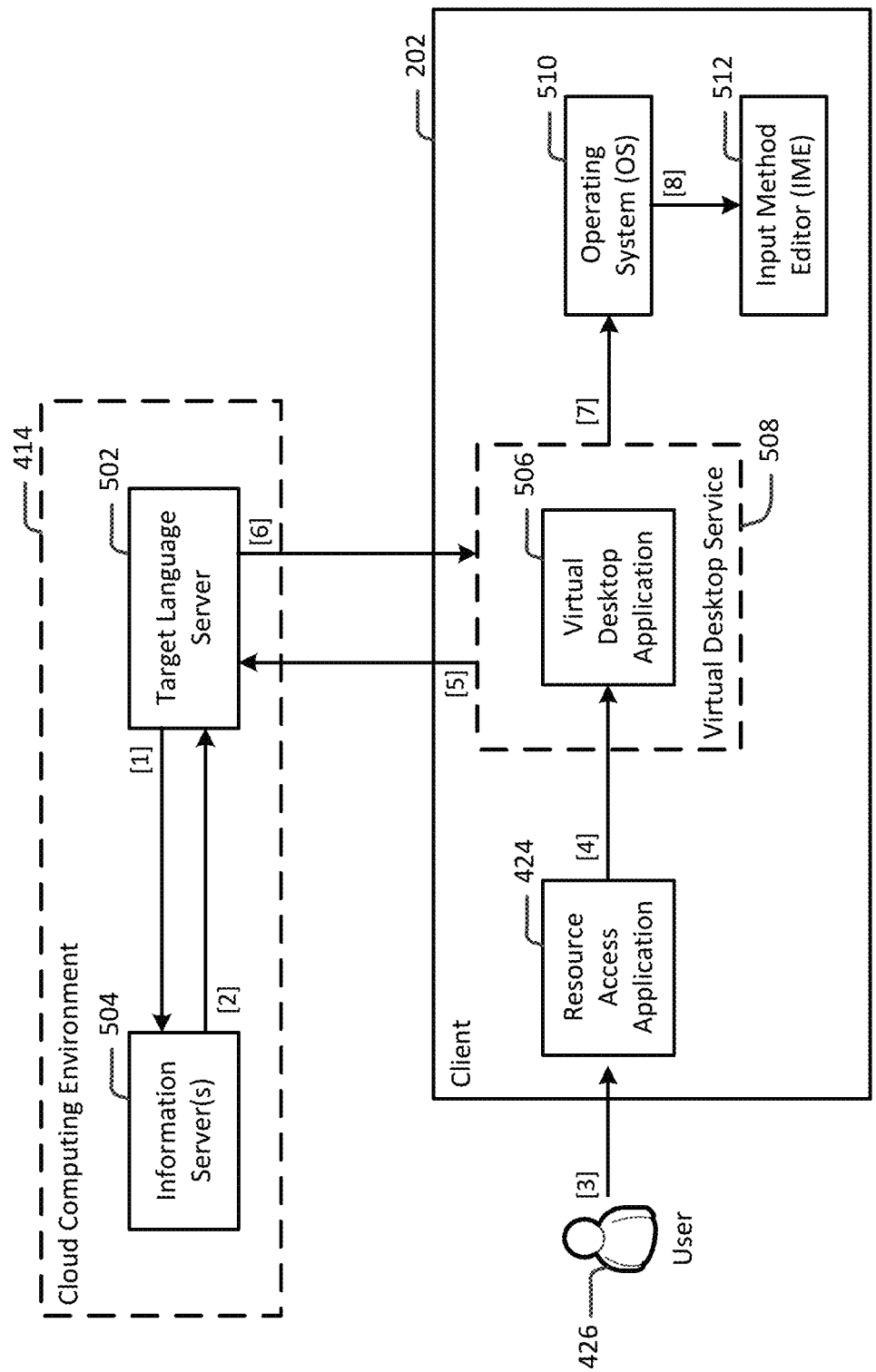
FIG. 5 is a block diagram of a system that can be used to configure a language mode of an input method editor (IME) to a target language, in accordance with an embodiment of the present disclosure.

FIG. 5 is a block diagram of a system that can be used to configure a language mode of an input method editor (IME) to a target language, in accordance with an embodiment of the present disclosure. The system has a topology which enables an organization to allow its users (such as employees, contractors, agents, partners, or other users associated with the organization) to leverage the services provided by resource access application 424 and cloud computing environment 414. For example, in some embodiments, resource access application 424 may be a client application, such as the Citrix Workspace app, which provides a user of the organization (e.g., user 426) with a personalized interface enabling access to the user's cloud services and applications (e.g., SaaS and web applications), files, and virtual desktops (e.g., Citrix Virtual Apps and Desktops™). To facilitate IME language mode configuration, the organization may provide a server (e.g., a target language server 502) in cloud computing environment 414. Target language server 502 may be configured to retrieve or otherwise obtain a corpus of data items (e.g., user account information and communication items) of or otherwise associated with (e.g., belonging to) the organization and assign target language values to the corpus of data items. When user 426 activates or otherwise launches a messaging feature of an application, such as an application provided via the virtual desktop service, the application may retrieve from target language server 502 a target language value and cause the language mode of the IME to be configured to a target language represented by the target language value.

For example, as shown in FIG. 5, target language server 502 may send a request [1] to retrieve or otherwise obtain data items (e.g., user account information and communication items, such as emails and other types of messages) to one or more information servers 504 of cloud computing environment 414. Information servers 504 may be private or public servers that provide information. In some embodiments, information servers 504 may be servers that are maintained by the same organization that is maintaining target language server 502. In any case, target language server 502 may send or otherwise provide to information servers 504 authentication credentials (e.g., username and password of the organization) which may be needed to retrieve the data items with the request for the data items. For example, the authentication credentials may be used to authenticate a user (e.g., an organization) providing the credentials and, following authentication, authorize access to data items, such as the organization's data items.

Upon receiving the request, information servers 504 may authenticate the authentication credentials provided by target language server 502. Upon successful authentication, information servers 504 may send or otherwise provide [2] to target language server 502 the data items that target language server 502 is authorized to access based on the provided authentication credentials. Target language server 502 can then label or otherwise assign to the corpus of data items target language values that represent specific languages. Target language server 502 can then provide the target language values to client applications, such as resource access application 424, for use in configuring language modes of IMEs as will be further described below.

For example, in some implementations, target language server 502 may be programmed or otherwise configured to (e.g., include an application that is configured to) retrieve or otherwise obtain user account information for user accounts of users of an organization. Target language server 502 may provide authentication credentials of the organization to retrieve or otherwise obtain such user account information from an Active Directory server and/or other directory or domain servers. Upon receiving the request, the Active Directory server and/or other directory or domain servers may authenticate the authentication credentials provided by target language server 502. Upon successful authentication, the Active Directory server and/or other directory or domain servers may send or otherwise provide to target language server 502 the user account information that target language server 502 is authorized to access based on the provided authentication credentials.

The retrieved user account information may be for user accounts made or established with telecommunications applications and services that support real-time text communications. Such user account information may include data regarding attributes of the user accounts, such as account names (e.g., account holders' names), nationalities of users associated with or otherwise identified by the user accounts, and geographic regions associated with or otherwise assigned to the user accounts. Based on the user account attributes, target language server 502 may label or otherwise assign to the user accounts target language values.

In some embodiments, the retrieved user account information may be for user accounts of users of another organization. In this case, target language server 502 may be provided authentication credentials which may be used to retrieve or otherwise obtain the user account information for the user accounts of the users of the other organization. For example, an authorized user of the other organization may provide to target language server 502 the authentication credentials (e.g., username and password of the other organization) needed to retrieve or otherwise obtain the user account information of the other organization from the Active Directory server and/or the other directory or domain servers.

Target language server 502 may apply one or more rules to determine a target language value for a user account. An example rule may specify that a target language is to be determined based on a location or a geographic region of a user associated with the user account. For example, if a geographic region associated with a user account indicates United States, then target language server 502 can determine a target language of English (American) for the user account. Another example rule may specify that a target language is to be determined based on a nationality of a user associated with the user account. For example, if a nationality of a user of a user account indicates Korean, then target language server 502 can determine a target language of Korean for the user account. Another example rule may specify that a target language is to be determined based on a name of a user associated with the user account. For example, a target language may be based on the origin of the name of the user associated with the user account. In an embodiment, the rules may be prioritized such that a first rule takes precedence over a second rule in determination of a target language. Having determined target languages for the obtained user accounts, target language server 502 may label or otherwise assign to the user accounts target language values representing the determined target languages. In cases where a target language cannot be determined for a user account, target language server 502 can label or otherwise assign to the user account a default value which indicates that the target language for an IME is, for example, the language specified for the operating system.

Target language server 502 may periodically retrieve or otherwise obtain the user account information from the directory or domain servers. For example, target language server 502 may retrieve or otherwise obtain such user account information about every 12 hours, 18 hours, 24 hours, 36 hours, or any other suitable period of time. The frequency with which target language server 502 retrieves or otherwise obtains the user account information may be tunable, for example, by an authorized user (e.g., an administrator) of target language server 502.

In some implementations, target language server 502 may be programmed or otherwise configured to (e.g., include an application that is configured to) retrieve or otherwise obtain communication items, such as emails and other messages, hosted by the organization. Such communication items may include both incoming and outgoing communications (e.g., incoming and outgoing email messages) to the organization's messaging domain and which may be managed using a shared or dedicated mail server and/or other store-and-forward messaging server. Target language server 502 may provide authentication credentials of the organization to retrieve or otherwise obtain such communication items from the mail servers and/or other store-and-forward messaging servers. Upon receiving the request, the mail servers and/or other store-and-forward messaging servers may authenticate the authentication credentials provided by target language server 502. Upon successful authentication, the mail servers and/or other store-and-forward messaging servers may send or otherwise provide to target language server 502 the communication items that target language server 502 is authorized to access based on the provided authentication credentials.

The retrieved communication items may be items of text communication. The text communication may be a communication between one entity (a sender) and another entity (a receiver) through the use of text (e.g., written words). That is, the medium of communication in text communication is primarily written words. Notwithstanding, text communication may also include other types of contents, such as image, voice, and video, to name three examples, in addition to text.

Target language server 502 may determine target languages for the retrieved items of communication based on an attribute or attributes, such as a predominant language, of the contents of the items of communication. For example, in the case where the contents of an item of communication is predominantly in Spanish, target language server 502 determine a target language of Spanish for the item of communication. In cases where the item of communication includes multiple communications, such as may be in the case of an email or communication thread, the target language determination may be made based on the language of the most recent communication. Having determined target languages for the obtained items of communication, target language server 502 may label or otherwise assign to the items of communication target language values representing the determined target languages. In cases where a target language cannot be determined for a communication item, target language server 502 can label or otherwise assign to the communication item a default value which indicates that the target language for an IME is, for example, the language specified for the operating system.

Target language server 502 may periodically retrieve or otherwise obtain the items of communication from the mail servers and other store-and-forward messaging servers. For example, target language server 502 may retrieve or otherwise obtain such communication items about every 60 seconds, 90 seconds, 120 seconds, or any other suitable period of time. The frequency with which target language server 502 retrieves or otherwise obtains the items of communication may be tunable, for example, by an authorized user (e.g., an administrator) of target language server 502.

Still referring to the example embodiment of FIG. 5, user 426 may launch [3] an instance of resource access application 424 on client 202. Using resource access application 424, user 426 may launch [4] a virtual desktop application 506, such as a SaaS collaboration application, provided via a virtual desktop service 508 on client 202. While using virtual desktop application 506, user 426 may activate or otherwise launch a messaging feature of virtual desktop application 506 to send a real-time message, such as a chat message or other similar instant message, to another user (e.g., another participant in an online collaboration session established using virtual desktop application 506).

Upon detecting the launch of the messaging feature, virtual desktop application 506 can send a request to virtual desktop service 508 to retrieve from target language server 502 a target language value for the real-time message. In other words, virtual desktop application 506 can call virtual desktop service 508 to determine a target language to be used in authoring or otherwise composing the real-time message. In response, virtual desktop service 508 may send [5] a request to target language server 502 for a target language value. Virtual desktop service 508 may send or otherwise provide to target language server 502 information regarding an intended recipient of the message (e.g., user account information of the intended recipient of the real-time message) with the request for the target language value. Target language server 502 can then send or otherwise provide [6] to virtual desktop service 508 a target language value associated with the recipient of the message. For example, target language server 502 can use the intended recipient information to identify a user account from the corpus of labeled user accounts, determine a target language value that is assigned to the identified user account, and send the target language value to virtual desktop service 508.

Upon receiving the target language value, virtual desktop service 508 may send [7] a request to an operating system (OS) 510 of client 202 to configure a language mode of an IME of client 202 to a target language represented by the target language value. In some embodiments, virtual desktop service 508 can determine the target language represented by the target language value. In other embodiments, OS 510 can determine the target language represented by the target language value. In any case, OS 510 may configure [8] the language mode of the IME to the target language represented by the target language value. As previously described, the target language value may be a default value which indicates that the target language for configuring the language mode of the IME is the language specified for the operating system. In such cases, the language mode of the IME is set to the same language as the underlying operating system (i.e., the language of the operating system of client 202). The configured IME of client 202 may then be provided to user 426 for use in authoring or otherwise composing a message to be communicated via virtual desktop application 506.

The system topology previously described for real-time messages similarly applies to other types of messages, such as store-and-forward messages. For example, in the context of store-and-forward messages, for example, email messages, user 426 may launch [3] an instance of resource access application 424 on client 202. User 426 may then launch [4] a virtual desktop application 506, such as a SaaS email client application, provided via a virtual desktop service 508 on client 202. User 426 may then activate or otherwise launch a reply (or reply all) feature of the email client application to reply to an email message (e.g., reply to an email message in an email thread).

Upon detecting the launch of the reply (or reply all) feature, virtual desktop application 506 can send a request to virtual desktop service 508 to retrieve from target language server 502 a target language value for the email message. In response, virtual desktop service 508 may send [5] a request to target language server 502 for a target language value. Virtual desktop service 508 may send or otherwise provide to target language server 502 information regarding the email message (e.g., email sender and receiver information, email message subject information, date and time information of the email message being responded to, etc.) with the request for the target language value. Target language server 502 can then send or otherwise provide [6] to virtual desktop service 508 a target language value. For example, target language server 502 can use the provided information regarding the email message to identify an email message from the corpus of labeled email messages, determine a target language value that is assigned to the identified email message, and send the target language value to virtual desktop service 508.

Upon receiving the target language value, virtual desktop service 508 may send [7] a request to an operating system (OS) 510 of client 202 to configure a language mode of an IME of client 202 to a target language represented by the target language value. OS 510 may then configure [8] the language mode of the IME to the target language represented by the target language value. The configured IME of client 202 may then be provided to user 426 for use in authoring or otherwise composing a reply email message to be communicated via virtual desktop application 506.

Figure 6:
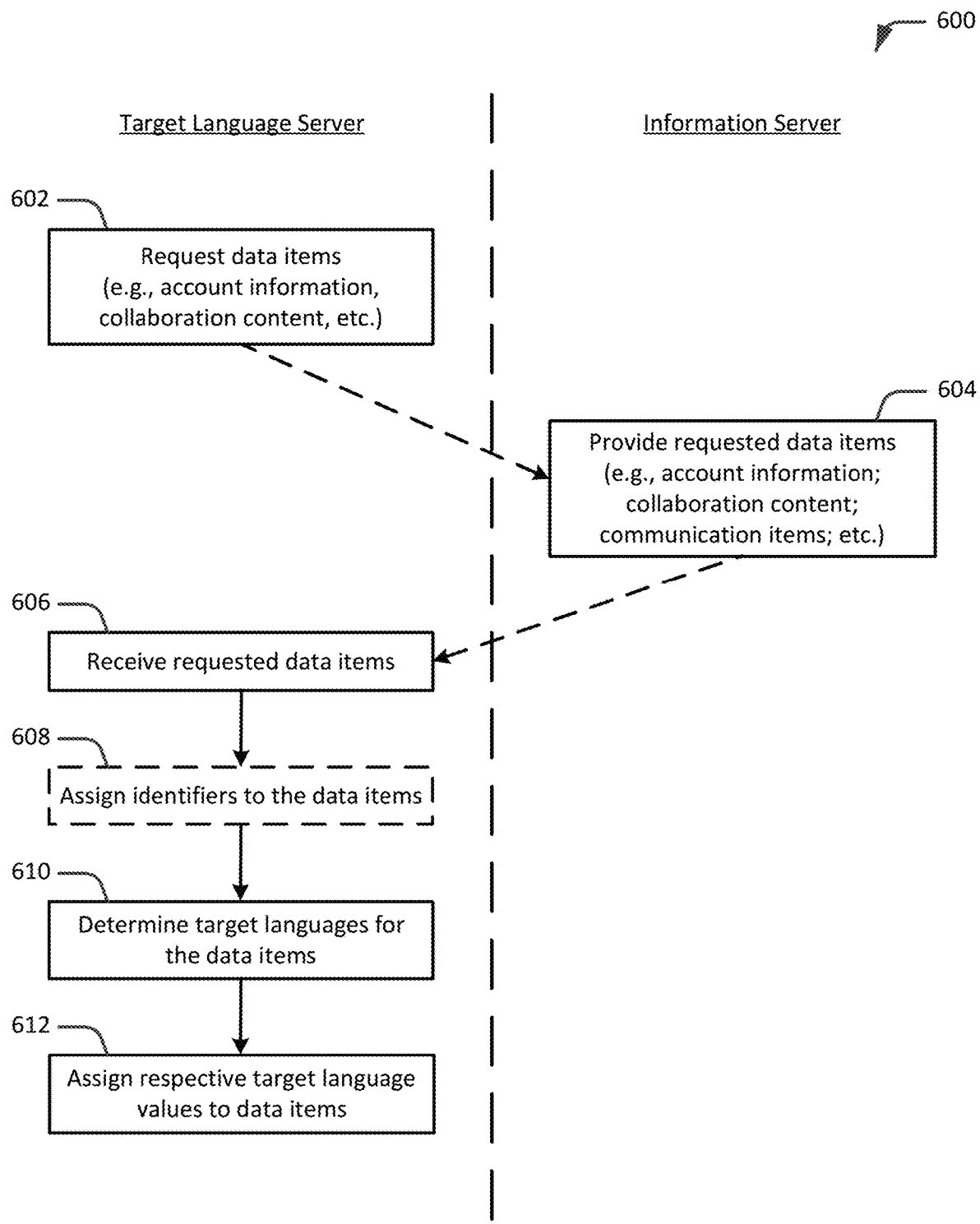
FIG. 6 is a flow diagram of an example process for determining target language values for data items, in accordance with an embodiment of the present disclosure.

FIG. 6 is a flow diagram of an example process 600 for determining target language values for data items, in accordance with an embodiment of the present disclosure. Example process 600, and example processes 700 and 800 further described below, may be implemented or used within a computing environment or system such as those disclosed above at least with respect to FIG. 2, FIG. 3, and/or FIGS. 4A-4C. For example, in some embodiments, the operations, functions, or actions illustrated in example process 600, and example processes 700 and 800 further described below, may be stored as computer-executable instructions in a computer-readable medium, such as volatile memory 122 and/or non-volatile memory 128 of computing device 100 of FIG. 2 (e.g., computer-readable medium of client machines 102 of FIG. 1, client machines 102a-102n of FIG. 3 and/or clients 202 of FIGS. 4A-4C). In some embodiments, example process 600, and example processes 700 and 800 further described below, may be implemented by application software, such as resource access application 424, which may run on a suitable computing device, such as computing device 100 of FIG. 2, client machines 102a-102n of FIG. 3, and/or clients 202 of FIGS. 4A-4C. For example, the operations, functions, or actions described in the respective blocks of example process 600, and example processes 700 and 800 further described below, may be implemented by applications 116 and/or data 117 of computing device 100.

With reference to FIG. 6, process 600 is initiated and, at 602, a server, such as target language server 502, may send requests for data items to one or more information servers (e.g., directory servers and mail servers). Target language server 502 may send or otherwise provide to the information servers authentication credentials (e.g., username and password of an organization) which may be needed to retrieve the data items with the requests for the data items. For example, target language server 502 may periodically send the requests to retrieve or otherwise obtain a corpus data items for use in determining target language values. The target language values can then be provided to clients, such as client 202, for configuring language modes of IMEs on the clients.

In response to the requests, at 604, the information servers, such as information servers 504, may authenticate the authentication credentials provided by target language server 502. Upon successful authentication, information servers 504 may send or otherwise provide to target language server 502 the requested data items that target language server 502 is authorized to access. Non-limiting examples of data items include user account information, collaboration content, and communication items, such as email messages). Certain data items, such as communication items, may include information such as, for example, information regarding a sender of the communication, information regarding the recipient of the communication, information regarding the subject of the communication, and date and time of the communication.

At 606, target language server 502 may receive the data items sent or otherwise provided by information servers 504. At 608, target language server 502 may optionally assign identifiers to the data items received from information servers 504. Assigning identifiers to the data items may allow for improved (and ideally optimized) speed and performance in storing, searching, and identifying relevant data items.

At 610, target language server 502 may determine target languages for the corpus of data items. For example, the target languages may be determined based on an attribute or attributes of the data items. Non-limiting examples of such attributes include a name of a user of a user account, a nationality of a user associated with a user account, a geographic region associated with a user account, and a predominant language of the contents of a communication.

At 612, target language server 502 may assign respective target language values to the data items. The target language values represent specific languages such as English, Chinese, Korean, Japanese, Spanish, German, and Italian. A target language value assigned to a data item identifies a target language that was determined for the data item based on attribute(s) of the data item (e.g., operation 610 of process 600). In an implementation, the target language values may be assigned to the identifiers of the data items.

Figure 7:
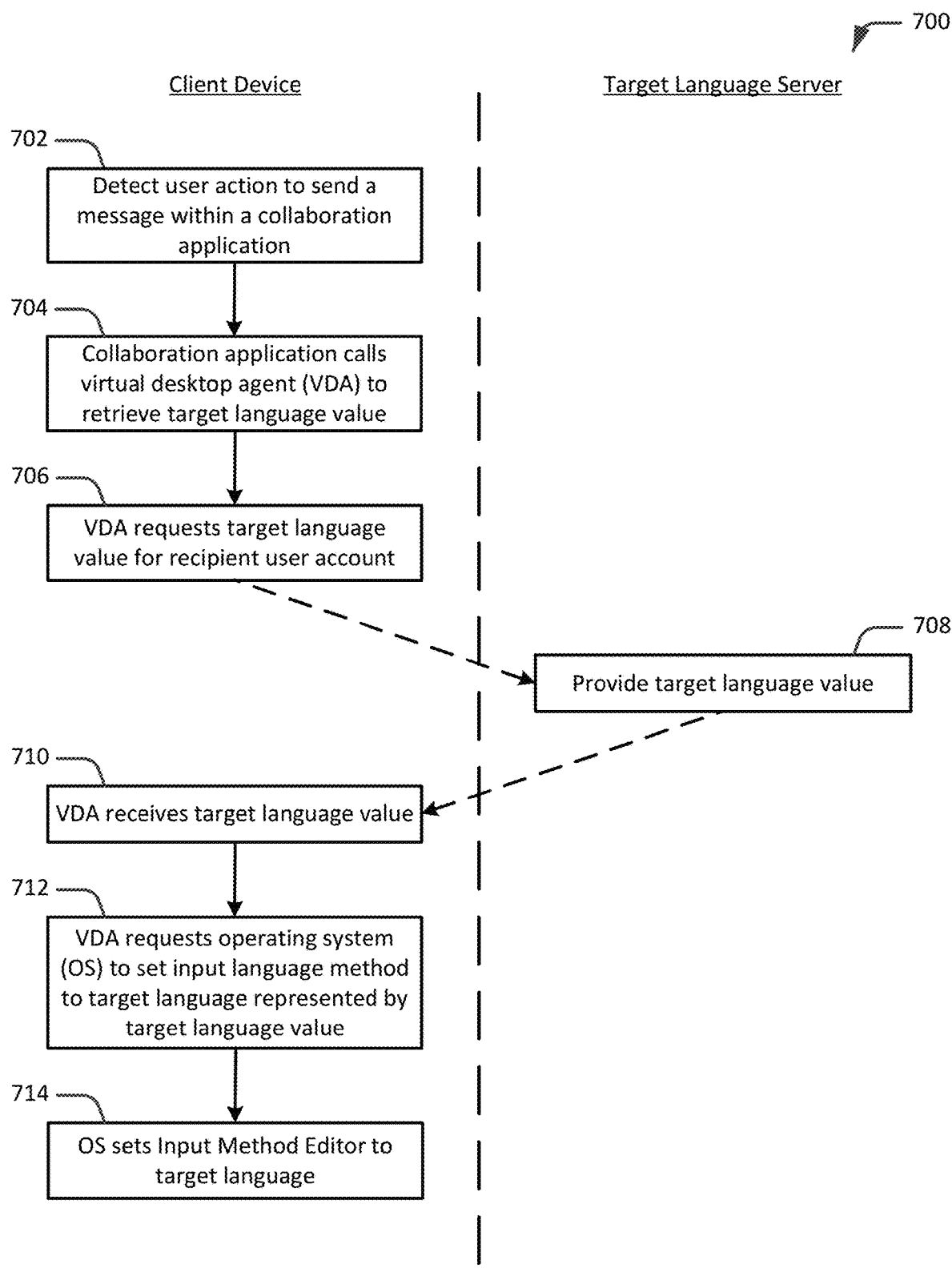
FIG. 7 is a flow diagram of an example process for configuring a language mode of an input method editor (IME) based on attributes of a user account, in accordance with an embodiment of the present disclosure.

FIG. 7 is a flow diagram of an example process 700 for configuring a language mode of an input method editor (IME) based on attributes of a user account, in accordance with an embodiment of the present disclosure. For example, user 426 may use remote access application 424 running on client 202 to participate in a collaboration session using virtual desktop application 506 (e.g., a collaboration application such as Skype®). During the collaboration session, user 426 may activate a messaging feature of virtual desktop application 506 to send a message to another participant in the collaboration session.

At 702, virtual desktop application 506 may detect the action by user 426 to send a message to another participant in the collaboration session. At 704, virtual desktop application 506 may call a virtual desktop, such as virtual desktop service 508, to retrieve a target language value for use in configuring a language mode of an IME.

At 706, virtual desktop service 508 may send a request to target language server 502 for a target language value to use in configuring the IME. Virtual desktop service 508 may send or otherwise provide to target language server 502 information regarding the intended recipient of the message (e.g., user account information of the other participant in the collaboration session who is to receive the message) with the request for the target language value.

In response to the request, at 708, target language server 502 may send or otherwise provide to virtual desktop service 508 a target language value based on the specified intended message recipient information. For example, target language server 502 can identify a data item (e.g., user account) from the corpus of labeled data items that matches the intended message recipient information. Target language server 502 can then send to virtual desktop service 508 the target language value of the identified data item.

At 710, virtual desktop service 508 may receive the target language value sent or otherwise provided by target language server 502. The target language value identifies a language appropriate for use in communicating with the recipient of the message. At 712, virtual desktop service 508 may send a request to the underlying operating system (OS) of client 202 set a language mode of an IME to a target language represented by the target language value.

At 714, the OS of client 202 may set the language mode of the IME to the target language represented by the target language value. The OS of client 202 may then provide the IME configured for the target language to user 426 for use in authoring or composing the message to be sent to the other participant in the collaboration session.

Figure 8:
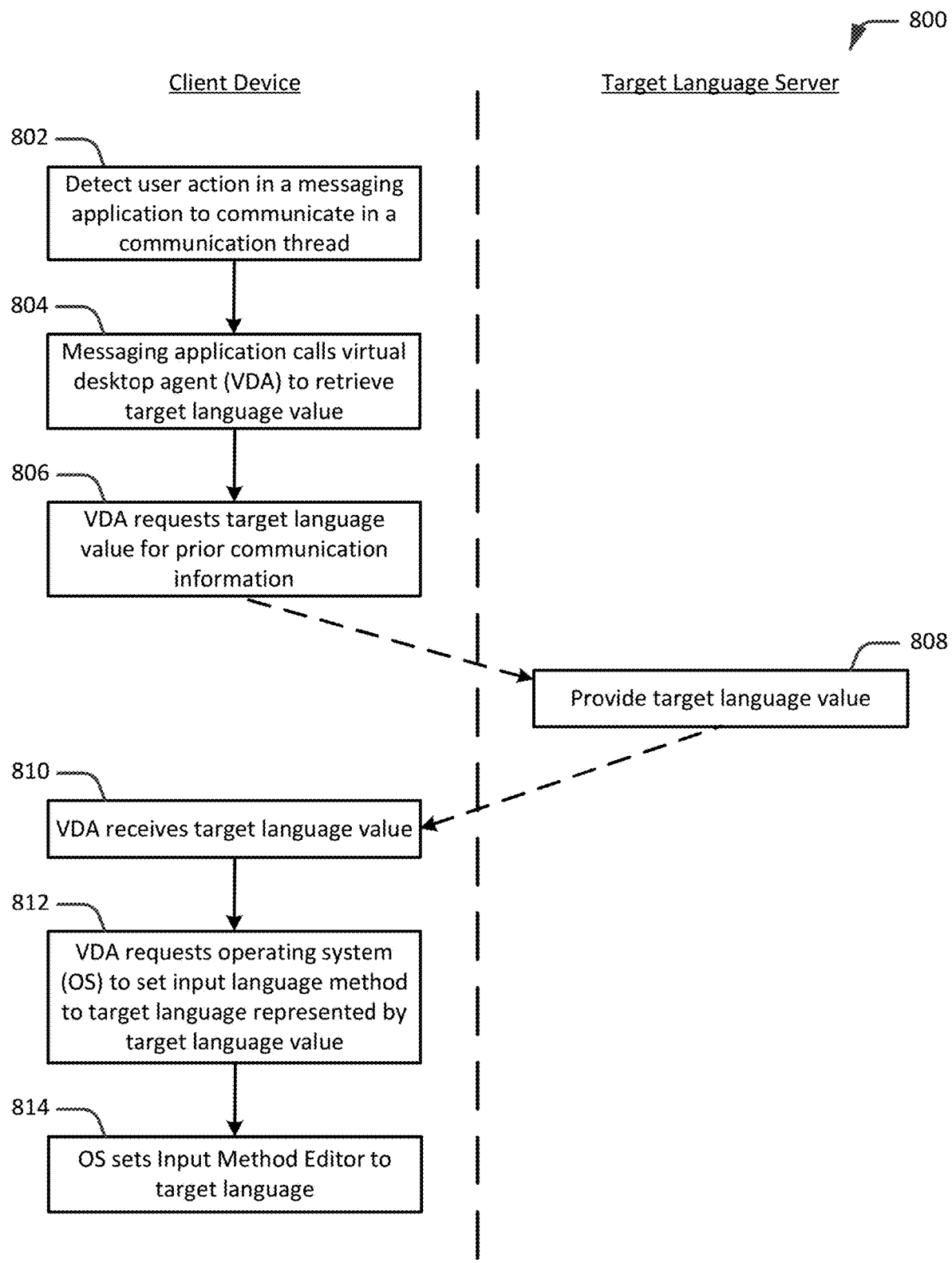
FIG. 8 is a flow diagram of an example process for configuring a language mode of an input method editor (IME) based on attributes of a prior communication, in accordance with an embodiment of the present disclosure.

FIG. 8 is a flow diagram of an example process 800 for configuring a language mode of an input method editor (IME) based on attributes of a prior communication, in accordance with an embodiment of the present disclosure. For example, user 426 may use remote access application 424 running on client 202 to view messages, such as email messages, using virtual desktop application 506 (e.g., a messaging client application such as an email client application). Using virtual desktop application 506, user 426 may view an email message and activate a reply (or reply all) feature to reply to the email message.

At 802, virtual desktop application 506 may detect the action by user 426 to reply (or reply all) to the email message. At 804, virtual desktop application 506 may call a virtual desktop, such as virtual desktop service 508, to retrieve a target language value for use in configuring a language mode of an IME.

At 806, virtual desktop service 508 may send a request to target language server 502 for a target language value to use in configuring the IME. Virtual desktop service 508 may send or otherwise provide to target language server 502 information regarding the email message that is being replied to (e.g., email sender and receiver information, email message subject information, date and time information of the email message being responded to, etc.) with the request for the target language value.

In response to the request, at 808, target language server 502 may send or otherwise provide to virtual desktop service 508 a target language value based on the specified email message information. For example, target language server 502 can identify a data item (e.g., email message) from the corpus of labeled data items that matches the specified email message information. Target language server 502 can then send to virtual desktop service 508 the target language value of the identified data item.

At 810, virtual desktop service 508 may receive the target language value sent or otherwise provided by target language server 502. The target language value identifies a language appropriate for use in communicating with the recipient of the email message. At 812, virtual desktop service 508 may send a request to the underlying operating system (OS) of client 202 set a language mode of an IME to a target language represented by the target language value.

At 814, the OS of client 202 may set the language mode of the IME to the target language represented by the target language value. The OS of client 202 may then provide the IME configured for the target language to user 426 for use in authoring or composing the email message to be sent in reply to the prior email message in the email thread.

The following examples pertain to further embodiments, from which numerous permutations and configurations will be apparent.

Example 1 includes a method including: detecting, by a computing device, a communication to a recipient via a software application running on the computing device; determining, by the computing device, a target language for the communication; and configuring, by the computing device, a language mode of an input method editor to the target language.

Example 2 includes the subject matter of Example 1, wherein determining the target language is based on account information of the recipient of the communication.

Example 3 includes the subject matter of Example 2, wherein the account information includes one or more of an account name, a nationality of the recipient, or a geographic location of the recipient.

Example 4 includes the subject matter of any of Examples 1 through 3, wherein determining the target language is based on contents of a prior communication that precedes the communication.

Example 5 includes the subject matter of any of Examples 1 through 4, wherein the software application is a conferencing application.

Example 6 includes the subject matter of any of Examples 1 through 4, wherein the software application is an email application.

Example 7 includes the subject matter of any of Examples 1 through 4, wherein the software application is a messaging application.

Example 8 includes the subject matter of any of Examples 1 through 7, wherein determining the target language for the communication includes: sending a request to a remote server for an indication of the target language for the communication, the request including information regarding the communication; and receiving from the remote server the indication of the target language for the communication.

Example 9 includes a system including a memory and one or more processors in communication with the memory and configured to: detect a communication to a recipient via a software application running on the computing device; determine a target language for the communication; and configure a language mode of an input method editor to the target language.

Example 10 includes the subject matter of Example 9, wherein to determine the target language is based on account information of the recipient of the communication.

Example 11 includes the subject matter of Example 10, wherein the account information includes one or more of an account name, a nationality of the recipient, or a geographic region of the recipient.

Example 12 includes the subject matter of any of Examples 9 through 11, wherein to determine the target language is based on a language of a prior communication that precedes the communication.

Example 13 includes the subject matter of any of Examples 9 through 12, wherein the communication is one of a real-time communication and a store-and-forward communication.

Example 14 includes the subject matter of any of Examples 9 through 13, wherein to determine the target language for the communication includes: send a request to a remote server for an indication of the target language for the communication, the request including information regarding the communication; and receive from the remote server the indication of the target language for the communication.

Example 15 includes the subject matter of any of Examples 9 through 14, wherein the software application is a conferencing application.

Example 16 includes the subject matter of any of Examples 9 through 14, wherein the software application is an email application.

Example 17 includes the subject matter of any of Examples 9 through 14, wherein the software application is a messaging application.

Example 18 includes a method including: extracting, by a computing server, at least one data item from a remote server; and processing the at least one data item to determine a target language for the data item.

Example 19 includes the subject matter of Example 18, wherein the remote server is an account server, and the at least one data item includes user account information.

Example 20 includes the subject matter of Example 19, wherein the user account information includes one or more of an account name, a nationality, and a geographic region.

Example 21 includes the subject matter of Example 18, wherein the remote server is an email server, and the at least one data item includes an email message.

Example 22 includes the subject matter of Example 21, wherein processing the at least one data item includes: determining a language of the email message based on contents of the email message; and setting the target language to a value representing the determined language.

Example 23 includes the subject matter of Example 22, wherein the email message is a last email message in an email thread containing the email message.

Example 24 includes a system including a memory and one or more processors in communication with the memory and configured to: extract at least one data item from a remote server; and process the at least one data item to determine a target language for the data item.

Example 25 includes the subject matter of Example 24, wherein the remote server is an account server, and the at least one data item includes user account information.

Example 26 includes the subject matter of Example 25, wherein the user account information includes one or more of an account name, a nationality, and a geographic region.

Example 27 includes the subject matter of Example 24, wherein the remote server is an email server, and the at least one data item includes an email message.

Example 28 includes the subject matter of Example 27, wherein to process the at least one data item includes: determine a language of the email message based on contents of the email message; and set the target language to a value representing the determined language.

Example 29 includes the subject matter of Example 28, wherein the email message is a last email message in an email thread containing the email message.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method comprising:
    detecting, by a computing device, a communication to a recipient via a virtual desktop application running on the computing device;
    sending, by the virtual desktop application on the computing device, a request to a virtual desktop service on the computing device for a target language value for the communication;
    sending, by the virtual desktop service on the computing device, a request to a remote server for a target language value for the communication, the request including information regarding an intended recipient of the communication;
    receiving, by the virtual desktop service on the computing device, from the remote server the target language value for the communication;
    sending, by the virtual desktop service on the computing device, a request to an operating system on the computing device to configure a language mode of an input method editor to a target language represented by the target language value; and
    configuring, by the operating system on the computing device, the language mode of the input method editor to the target language represented by the target language value.

2. The method of claim 1, wherein the target language value is determined based on account information of the recipient of the communication.

3. The method of claim 2, wherein the account information includes one or more of an account name, a nationality of the recipient, or a geographic location of the recipient.

4. The method of claim 1, wherein the target language value is determined based on contents of a prior communication that precedes the communication.

5. The method of claim 1, wherein the communication is a real-time communication.

6. The method of claim 1, wherein the communication is a store-and-forward communication.

7. A computing device comprising:
    a memory; and
    one or more processors in communication with the memory and configured to:
        detect a communication to a recipient via a virtual desktop application running on the computing device;
        send, by the virtual desktop application, a request to a virtual desktop service on the computing device for a target language value for the communication;
        send, by the virtual desktop service, a request to a remote server for the target language value for the communication, the request including information regarding an intended recipient of the communication;
        receive, by the virtual desktop service from the remote server, the target language value for the communication;
        send, by the virtual desktop service, a request to an operating system on the computing device to configure a language mode of an input method editor to a target language represented by the target language value; and configure, by the operating system, the language mode of the input method editor to the target language represented by the target language value.

8. The system of claim 7, wherein the target language value is determined based on account information of the recipient of the communication.

9. The system of claim 8, wherein the account information includes one or more of an account name, a nationality of the recipient, or a geographic region of the recipient.

10. The system of claim 7, wherein the target language value is determined based on a language of a prior communication that precedes the communication.

11. The system of claim 7, wherein the communication is one of a real-time communication and a store-and-forward communication.

12. A non-transitory machine-readable medium encoding instructions that when executed by one or more processors cause a process to be carried out, the process comprising:

detecting a communication to a recipient via a virtual desktop application running on a computing device;

sending, by the virtual desktop application, a request to a virtual desktop service for a target language value for the communication;

sending, by the virtual desktop service, a request to a remote server for the target language value for the communication, the request including information regarding an intended recipient of the communication;

receiving, by the virtual desktop service from the remote server, the target language value for the communication;

sending, by the virtual desktop service, a request to an operating system to configure a language mode of an input method editor to a target language represented by the target language value; and configuring, by the operating system, the language mode of the input method editor to the target language represented by the target language value.

13. The machine-readable medium of claim 12, wherein the target language value is determined based on account information of the recipient of the communication.

14. The machine-readable medium of claim 13, wherein the account information includes one or more of an account name, a nationality of the recipient, or a geographic location of the recipient.

15. The machine-readable medium of claim 12, wherein the target language value is determined based on contents of a prior communication that precedes the communication.

* * * * *